Patented May 12, 1936

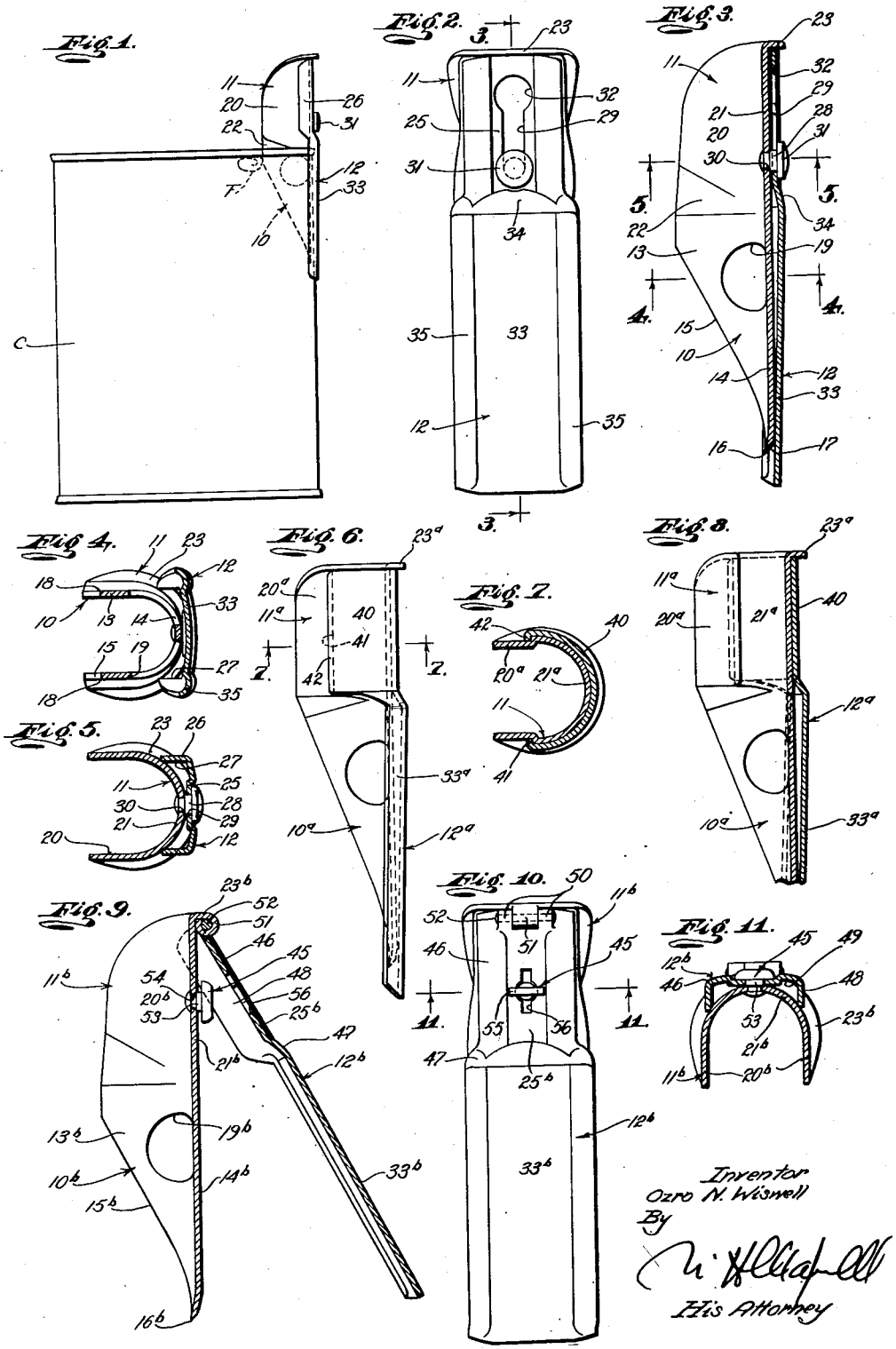

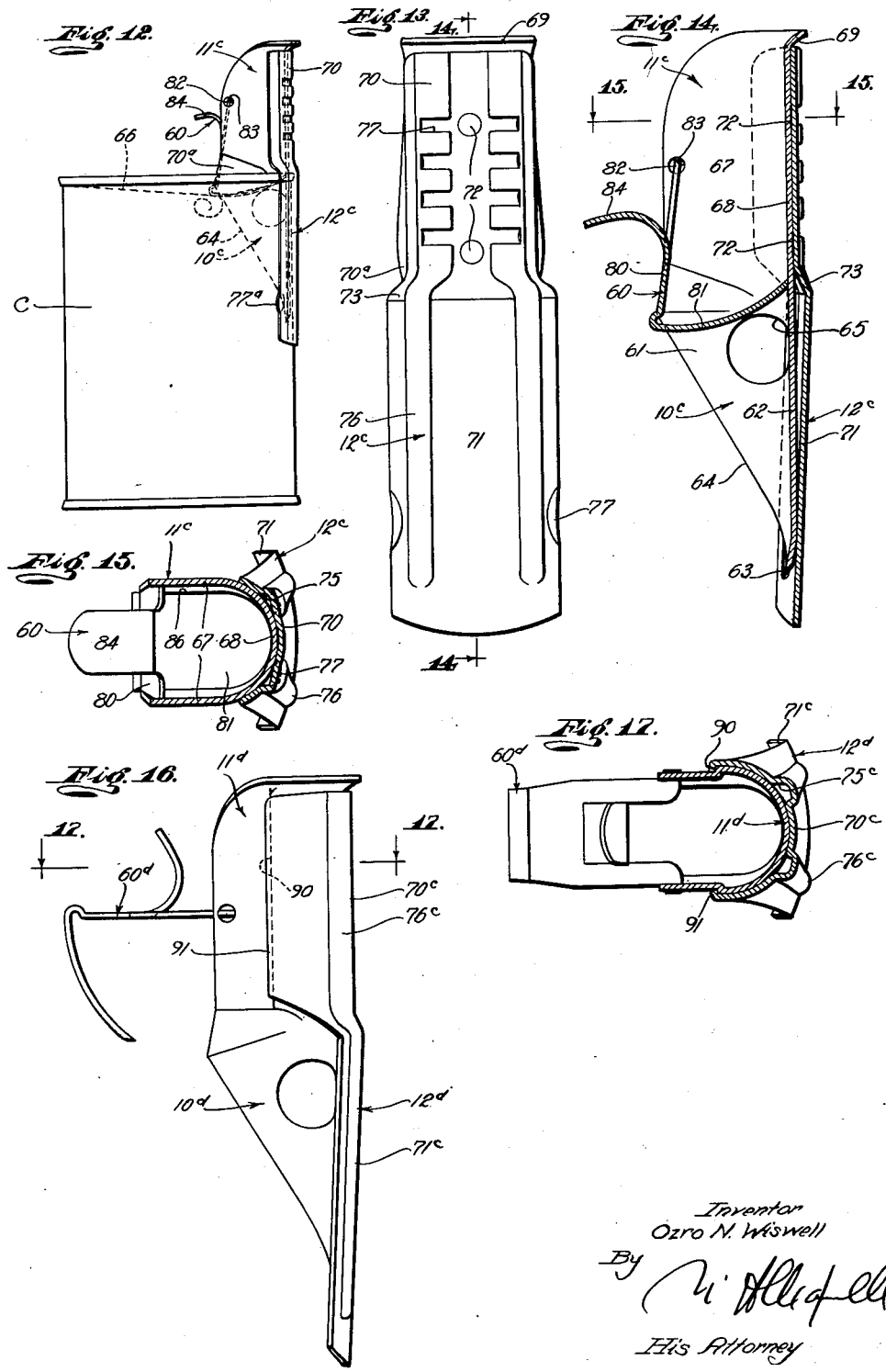

2,040,585

UNITED STATES PATENT OFFICE 2,040,585

OPENING AND POURING DEVICE FOR CANS

Ozro N. Wiswell, Los Angeles, Calif.

Application January 9, 1934, Serial No. 705,891

16 Claims. (Cl. 221—23)

This invention relates to a device for opening sealed containers or cans, and it is a general object of the invention to provide a simple, practical and effective device for opening cans and for facilitating the pouring of the contents therefrom.

It is another object of the invention to provide a device for opening containers or cans that is operatable to cut an opening in a can and thereafter form an effective pouring spout for the opened can.

It is another object of the invention to provide a device of the character mentioned for opening containers or cans and for facilitating the draining or pouring of the contents from the cans that may be easily and quickly disassembled or taken apart for cleaning. The can opening and pouring device of the present invention is particularly adapted for opening cans holding liquid foods, such as syrups, fruit juices, vegetable juices, cooking oils, etc., as it provides an effective pouring spout for the opened can and may be readily disassembled for washing or cleaning after use.

It is another object of the invention to provide a can opening device of the character mentioned that may be easily forced or driven through an end of a container or can to cut an opening therein adjacent its edge or periphery and that thereafter forms an effective pouring spout for pouring and draining the contents from the can without leakage and without soiling the exterior of the can.

It is another object of the invention to provide a can opening device of the character mentioned that automatically becomes attached to a container upon cutting an opening therein so that it will not become accidentally or unintentionally detached during the pouring of the contents from the container or until it is intentionally removed from the container.

It is another object of the invention to provide an effective device for cutting an opening in a container or can and for thereafter constituting a pouring spout at the opening that includes a cover or closure for closing the opening in the container against the entrance of foreign matter, insects, etc.

It is another object of the invention to provide a device for opening containers or cans that is operatable to cut a comparatively large clean opening in the can that allows the entire contents to be quickly poured or drained from the can.

It is another object of the invention to provide a device of the character mentioned for opening containers or cans that may be readily thrust or driven through an end or wall of a can to cut an opening therein without bruising or otherwise injuring the user's hands.

It is another object of the invention to provide a device for opening a sealed container or can that is operatable to cut an opening in the can and thereafter form a pouring spout for the can and that is such that all of the faces or surfaces of its parts may be easily made accessible for cleaning, etc., without completely disconnecting its parts.

It is a further object of the invention to provide a can opening device of the character mentioned that is simple and convenient to use, and that is inexpensive of manufacture.

Other objects and features of the invention will be best and fully understood from the following detailed description of typical forms and applications of the invention, throughout which description reference is had to the accompanying drawings, in which:

Fig. 1 is a side elevation of one form of the invention illustrating it in position on a can or container after cutting an opening therein. Fig. 2 is an enlarged elevation of the outer side of the device illustrated in Fig. 1. Fig. 3 is a longitudinal detailed sectional view taken as indicated by line 3—3 on Fig. 2. Fig. 4 is a transverse detailed sectional view taken as indicated by line 4—4 on Fig. 3. Fig. 5 is a transverse detailed sectional view taken as indicated by line 5—5 on Fig. 3. Fig. 6 is a side elevation of another form of the invention. Fig. 7 is a transverse detailed sectional view taken as indicated by line 7—7 on Fig. 6. Fig. 8 is a longitudinal detailed sectional view of the upper portion of the device illustrated in Fig. 6. Fig. 9 is a longitudinal detailed sectional view of still another form of the invention illustrating the guide swung to an out position. Fig. 10 is an elevation view of the outer side of the device illustrated in Fig. 9. Fig. 11 is a transverse detailed sectional view taken as indicated by line 11—11 on Fig. 10. Fig. 12 is a side elevation of still another embodiment of the invention illustrating it in position on a can after having cut an opening therein. Fig. 13 is an enlarged elevation view of the outer side of the device illustrated in Fig. 12. Fig. 14 is a longitudinal detailed sectional view taken as indicated by line 14—14 on Fig. 13. Fig. 15 is a transverse detailed sectional view taken as indicated by line 15—15 on Fig. 14. Fig. 16 is a side elevation of still another embodiment of the invention showing the closure in the out or inoperative position, and Fig. 17 is a transverse detailed sectional view taken as indicated by line 17—17 on Fig. 16.

The present invention is capable of being embodied in forms for opening containers of various shapes, sizes, etc. Throughout the following detailed disclosure, I will describe several typical embodiments of the invention adapted to open containers of common or typical form, it being understood that the invention is not to be taken as limited or restricted to the specific forms or applications about to be described, but is to be taken as including any features or modifications that may fall within the scope of the claims.

The form of the invention illustrated in Figs. 1 to 5, inclusive, of the drawings, includes, generally, a cutter 10 operable to cut an opening in a container C and having a pouring or spout portion 11, and a guide 12 detachably connected with the cutter 10 for engaging the container C to guide the cutter.

The cutter 10 is adapted to be readily thrust or driven through the end of the can C to form an unobstructed opening therein through which the contents of the can may be poured or drained. The cutter 10 is substantially U-shaped in transverse cross sectional configuration having two substantially parallel side parts 13 and a transversely curved outer part 14 connecting the side parts 13. In practice, the cutter 10 may be integral, the side parts 13 being integrally connected by the outer part 14. In accordance with the invention, the lower or entering active end of the cutter 10 is pointed to readily pierce and cut through the wall of the container or can. The inner edges 15 of the side parts 13 are inclined downwardly and outwardly to converge at a point 16 on the lower end of the outer part 14. The edges 15 may extend throughout substantially the entire length of the cutter 10, that is, they may extend from the point 16 upwardly to the point where the cutter proper joins the spout portion 11. It is a feature of the present invention that the sloping or inclined edges 15 of the cutter are flat. The edges 15, where they extend along the inner edges of the side parts 13 are substantially normal to the surface of the side parts 13 and they have a twist or curvature where they extend along the edges of the outer part 14, due to the shaping of the cutter 10 from a flat blank having normal edges. The pointed lower end of the cutter may be vertical or at substantially right angles to the side parts 13; however, it is preferred to bend the pointed lower end of the cutter inwardly as clearly illustrated in Fig. 3 of the drawings. The outer surface of the pointed lower end of the cutter 10 may be bevelled downwardly to the point 16 as at 17.

When the cutter 10 is forced or driven into the end wall of the can C, the point 16 first pierces the wall and the diverging twisted or spiralled edges 15 of the part 14 widen the cut or opening in the can wall. The outer corners 18 of the edges 15 cut or shear through the can wall as the downward movement of the cutter continues, enlarging the opening in the can wall and bending inwardly the flap F formed by the cut. The edges 15, where they extend along the side parts 13 present flat surfaces for engaging the flap F at its opposite edges to positively bend the flap inwardly without causing the flap to buckle transversely and thus cut an opening in the container wall having a smooth regular edge. Further, the flat edges 15 of the cutter bend or roll the flap F downwardly and inwardly and then upwardly and outwardly to form a substantially tubular roll, as illustrated in Fig. 1 of the drawings, leaving the opening in the wall of the can completely unobstructed. The cutter 10 is formed and proportioned so that the outer surface of the side parts 13 tightly wedge and seal against the walls of the opening cut in the can wall to prevent the leakage of fluid around the cutter when the can is tipped or inverted to pour out its contents. This tight wedging or binding of the side walls 13 against the opening in the can C also aids to retain the cutter in its proper position on the can during the pouring or draining of the contents. In accordance with the invention, one or more openings 19 are provided in the cutter 10 adjacent its upper end to allow the contents of the can to drain out from around the cutter when the can is tipped or inverted. In the preferred construction illustrated in the drawings, there are two openings 19 provided in the cutter 10 at substantially opposite points located so as to be immediately adjacent the end wall of the can when the cutter is in its final position in the opening in the can wall to permit the fluid around the cutter to freely drain out through the spout 11.

The spout or spout portion 11 of the cutter 10 projects or continues upwardly from the upper end of the cutter to form an effective pouring spout on the can C after the cutter has made the opening in the end or the wall of the can. The spout portion 11 is substantially U-shaped or channel-shaped in transverse cross section having spaced side parts 20, and a transversely curved outer part 21 connecting or joining the side parts 20. The spout portion 11 may be somewhat wider than the cutter 10 so that the side parts 20 of the spout portion join the side parts 13 of the cutter at downwardly and inwardly inclined shoulders 22. The outer part 21 of the spout portion may form a regular or unbroken continuation of the portion 14 of the cutter. The side parts 20 of the spout or spout portion are imperforate and are comparatively wide to prevent the fluid from flowing over their edges when the contents are poured from the can. In accordance with the invention, a lip 23 is provided on the outer or upper end of the spout portion 11. The lip 23 projects laterally outwardly from the end of the spout portion and is formed sufficiently wide to present a comparatively large upper or outer surface adapted to be acted upon or struck in forcing or driving the cutter 10 through the wall of the can. It is apparent that the lip 23 also forms an effective pouring lip on the spout or spout portion 11. The upper and inner portions of the side parts 20 of the spout are preferably rounded where they join the outer part 21 as illustrated in Figs. 1 and 3 of the drawings.

The guide 12 is provided to cooperate with the exterior of the can C to guide the cutter 10 during the opening or cutting operation. The guide 12 also constitutes a means operating to hold the cutter 10 and its spout portion 11 in the proper position on the can C when the contents are poured or drained from the can. It is a feature of the present invention that the guide 12 is detachable or removable from the cutter 10 to allow all the surfaces and parts of the device to be thoroughly cleaned. The guide 12 is disposed or arranged at the outer side of the cutter portion 14 to cooperate with the periphery or exterior of the can C and is detachably connected to the spout portion 11. The guide 12 includes a shank to engage against the outer side of the spout or spout portion 11. The shank of the guide has a central and longitudinally extending recessed or indented portion 25 normally engaging or arranged in close relation to the outer surface of the spout part 21. The shank of the guide is bent outwardly at the opposite longitudinal edges of the indented portion 25, and its longitudinal edges are provided with inwardly projecting flanges 26. The inner edges of the flanges 26 are adapted to engage or abut the exterior of the spout portion. The longitudinal spaces or channels 27 formed between the shank of the guide, and the exterior of the spout portion 11 by the provision of the flanges 26 constitute drain openings which extend from points adjacent the upper end of the cutter 10 to the lip 23. In the preferred arrangement, the upper end of the guide or the shank of the guide engages under the lip 23 but the upper ends of the drains 27 are open to allow any liquid that may leak around the cutter to drain through them and discharge with the principal body of liquid at the lip.

The means for detachably connecting the guide 12 to the spout portion 11 of the cutter includes a projecting pin or stud 28 on the spout portion 11 for cooperating with an opening 29 in the indented portion 25 of the guide shank. The pin or stud 28 is preferably rigidly or fixedly attached to the spout portion 11. The stud 28 may be attached to the spout portion 11 in any suitable or practical manner. In the particular case illustrated in the drawings, the pin or stud 28 extends through an opening 30 in the spout portion 11 and has a shoulder engaging the outer surface of the spout portion and has its inner end riveted over at the inner surface of the spout portion. The opening 29 in the guide is in the nature of a slot or elongate opening extending longitudinally and centrally through the indented portion 25. The pin or stud 28 projects through the opening 29 and has an enlarged head 31 on its upper end for cooperating with the outer surface of the portion 25. When the guide 12 is in its normally operative position, the stud engages the lower end of the opening 29 in the manner clearly illustrated in Figs. 2 and 3 of the drawings. In accordance with the invention, the upper end part 32 of the opening 29 is enlarged and is proportioned to receive or pass the head 31 of the stud to disconnect the guide 12 from the spout portion of the cutter. The guide may be moved longitudinally or downwardly relative to the cutter to bring the enlargement 32 of the opening 29 to the head 31 of the stud, and the guide then moved outwardly relatively to the cutter to allow the head to pass through the enlarged portion of the opening to disconnect the guide from the cutter.

The principal part or can engaging part 33 of the guide 12 is preferably somewhat wider than the cutter 10 and the shank of the guide, and projects downwardly beyond the lower end of the cutter to form a guard for the point 16 of the cutter and to contact with the can prior to the point 16 during the can opening operation. The principal portion 33 of the guide 12 is spaced outwardly from the cutter 10, there being a downwardly and outwardly inclined shoulder 34 where it joins the shank of the guide. In practice, the principal portion 33 of the guide may be substantially parallel to the outer cutter part 14; however, it is preferred to have the principal part 33 of the guide inclined downwardly and inwardly toward the lower end of the cutter as illustrated in Fig. 3 of the drawings to have its lower end part frictionally engage the exterior of the can to guide the point 16 to pierce the end wall of the can immediately adjacent its periphery and to grip the wall of the can between the cutter and guide after the cut is made. The principal part 33 of the guide, in being inclined downwardly and inwardly as just described, engages against the exterior of the can C with considerable force when the cutter is in its final position to aid in holding the device on the can when the liquid is poured or drained from the can. In accordance with the broader principles of the invention, the can engaging part 33 of the guide 12 may be of any particular cross section to adapt the device for use on any specific type or shape of can. In the particular case illustrated in the drawings, the can engaging portion 33 of the guide is slightly curved in transverse cross section and has vertical parallel edges. Longitudinally extending ribs or corrugations 35 may extend along the opposite edges of the can engaging portion of the guide to reinforce it or give it the desired rigidity.

It is believed that the operation of the form of the invention illustrated in Figs. 1 to 5 inclusive of the drawings will be readily apparent from the foregoing detailed description. The device is normally assembled in the manner illustrated throughout the drawings to be immediately available for the opening of a can. To open the can C, the lower portion of the guide 12 projecting downwardly beyond the point 16 of the cutter is positioned against the peripheral edge of the can and the point 16 is caused to engage an end of the can immediately adjacent its periphery. Force, preferably in the form of a blow, is applied to the lip 23 to drive or force the cutter 10 downwardly through the end wall of the can. It is usually practical to strike the lip 23 with the heel of the open hand, or the butt of the clenched hand to drive the cutter through the container wall. As described above, the outwardly and downwardly diverging edges of the cutter part 14 enlarge the cut formed by the point 16 as the cutter moves downwardly, while the outer corners 18 of the side parts 13 enlarge the cut inwardly toward the center of the container wall through a shearing action. The edges 15 also roll the flap F into a tube where it is entirely clear of the opening cut in the container wall. The shoulder 34 of the guide and/or the shoulders 22 stop downward movement of the cutter in a position where the openings 19 are immediately adjacent the inner side of the upper end wall of the can as illustrated in Fig. 1 of the drawings. The inclined can engaging portion 33 of the guide slidably engages the exterior of the can during the cutting operation to effectively guide the cutter and to prevent undesirable tipping or inclined movement of the device. The opposite side parts 13 of the cutter 10 are closely wedged against the opposite walls of the cut in the container to seal therewith, and to aid in holding the cutter in position. As the spout portion 11 projects from the end of the can, it materially facilitates the pouring of the contents from the can, particularly where the liquid is to be poured into a receptacle having a comparatively small mouth. Any liquid that may leak around the cutter to the exterior of the can drains outwardly through the openings or drains 27 to discharge at the lip 23 and join the main body of discharging liquid. The device may be easily detached from the can by pulling it upwardly or outwardly out of engagement with the can. When it becomes necessary or desirable to wash the device, the guide 12 may be easily and quickly disconnected from the cutter by being moved or pulled longitudinally downward relative to the cutter to bring the enlargement 32 of the opening 29 into registration with the head 31 of the stud, thus permitting the guide 12 to be disconnected or detached from the cutter. The opposing and normally rather inaccessible surfaces of the guide and cutter are then all accessible for cleaning. The guide 12 may then be again connected with the cutter in the obvious manner to adapt the device for further use.

Figs. 6, 7 and 8 of the drawings illustrate a form or embodiment of the invention involving another means or manner of detachably connecting the guide 12a with the cutter 10a. The cutter 10a may be identical with the cutter 10 described above, while the spout portion 11a of the cutter may be substantially identical with the spout 11. The spout portion 11a is substantially U-shaped in transverse cross section, having spaced substantially parallel side parts 20a and a transversely curved outer part 21a. A laterally outwardly projecting lip 23a is provided on the outer end of the spout portion 11a to provide a comparatively large surface to be struck or acted upon when forcing the cutter through a wall of a can, and to facilitate the pouring of the liquid from the spout. The shank 40 of the guide 12a is shaped to closely fit or conform to the outer surface of the curved spout part 21a. The shank 40 is transversely curved, and is adapted to closely fit against the spout part 21a as clearly illustrated in Fig. 7 of the drawings. The outer or upper end of the shank 40 preferably engages under the lip 23a.

In accordance with the form of the invention illustrated in Figs. 6, 7, and 8 of the drawings, longitudinally extending and inwardly facing shoulders 41 are provided on the spout portion 11a where the side parts 20a join the outer part 21a. Flanges 42 are provided along the inner edges of the shank 40 to cooperate with the shoulders 41. The flanges 42 project inwardly or toward one another, and are adapted to bear outwardly against the shoulders 41. It will be apparent how the cooperation of the flanges 42 effectively holds the guide 12a against displacement or disconnection from the cutter 10a. To assemble the guide 12a or to connect the guide 12a with the cutter 10a, the shank 40 is placed against the part 21a of the spout portion so that its flanges 42 engage the outer surface of the part 21a. The spout portion 11a and the shank 40 are then pressed or forced together causing the shank to be flexed or spread, which allows the flanges 42 to move inwardly and to snap inwardly into position with the shoulders 41. To detach or disconnect the guide 12a from the cutter, the principal can engaging portion 33a of the guide is engaged and the guide is pulled outwardly relative to the cutter 10a to flex the shank 40 and cause the flanges 42 to be snapped out of engagement with the shoulders 41. The principal or can engaging portion 33a of the guide 12a may be similar to or identical with the portion 33 described above. The form of the invention illustrated in Figs. 6, 7 and 8 of the drawings is simple and inexpensive of manufacture and is particularly easy to disassemble and assemble.

Figs. 9, 10 and 11 of the drawings illustrate an embodiment of the invention which includes, generally, a cutter 10b, having a spout or spout portion 11b, a guide 12b hingedly or swingably connected with the spout portion 11b and releasable means 45 for normally holding the guide 12b in its operative position.

The cutter 10b is identical with the cutter 10 described above, that is, it is substantially U-shaped in transverse cross section having spaced side parts 13b connected by a transversely curved outer part 14b. The inner edges 15b of the cutter converge downwardly and outwardly to a point 16b at the lower end of the part 14b. Openings 19b are provided in the cutter to permit fluid to drain out of the can from around the cutter. The spout or spout portion 11b is a continuation or extension of the cutter 10b, being substantially U-shaped in transverse cross section. The spout portion 11b has side parts 20b joining and extending upwardly from the side parts 13b of the cutter, and an outer transversely curved part 21b constituting a continuation of the outer part 14b of the cutter. A laterally outwardly projecting lip 23b is provided on the upper end of the spout portion 11b.

The guide 12b is provided to engage the exterior of the can to guide the cutter 10b during the opening or cutting operation and to aid in holding or retaining the device on the can. In accordance with the embodiment of the invention being described, the guide 12b is pivotally or hingedly connected with the spout portion 11b of the cutter. The guide 12b may be similar to or identical with the guide 12 described above and includes a main or principal portion 33b for engaging the exterior of the can and a shank 46. The shank 46 is provided with a longitudinal centrally disposed indented portion 25b adapted to normally engage the outer surface of the spout part 21b. The lower can-engaging portion 33b of the guide has its upper portion spaced from the cutter 10b and joins the shank 46 at a downwardly and outwardly inclined shoulder 47. The shoulder 47 is adapted to engage the body of the periphery of the can to limit the downward movement of the cutter in the can. Inwardly projecting flanges 48 are provided along the opposite longitudinal edges of the shank 46 and normally have their edges in engagement with the spout portion 11b to provide drains 49 which extend from the shoulder 47 to the lip 23b. The drains 49 are adapted to carry any liquid, that may leak from around the cutter, to the lip to discharge with the main body of liquid poured from the can.

In accordance with the broader aspects of the invention, the guide 12b may be hingedly or pivotally connected with the spout portion 11b in any suitable or practical manner. In the typical structure illustrated in the drawings, the upper end portion of the shank 46 is yoked to have two spaced tubular arms or lugs 50, and the lip 23b has a downwardly extending tubular lug 51 projecting between the lugs 50. A hinge or pivot pin 52 extends through the openings of the lugs 50 and 51 to pivotally connect the guide 12b with the spout portion 11b of the cutter. With the hinged connection just described, the guide 12b is adapted to be swung to a position away from and clear of the outer surface of the cutter and its spout portion when the means 45 is released to render the outer surface of the cutter and spout and the inner surface of the guide accessible for cleaning, etc.

The means 45 is operable to normally hold the guide 12b in its normal position alongside of the cutter 10b and its spout portion 11b as illustrated in Figs. 10 and 11 of the drawings, and is releasable to permit the guide 12b to swing outwardly away from the cutter. The means 45 includes a projecting pin or stud or latch-key 53 on the spout portion 11b of the cutter for cooperating with the guide 12b. The key 53 extends through and is rotatable in an opening 54 in the outer part 21ᵇ of the spout portion. The inner end of the key may be riveted over as illustrated in Figs. 9 and 11. In accordance with the invention, the key 53 is provided with a transverse or diametric elongate head 55. The head 55 is spaced from the outer surface of the spout part 21ᵇ. An elongate longitudinally extending opening 56 is provided in the indented portion 25ᵇ of the shank 46 to receive or pass the head of the key. The opening 56 is enlarged at a point between its ends to receive the body of the key 53. When the key 53 is turned to a position where its head 55 is horizontal or transverse of the shank 46, the head engages the outer side of the indented part of the shank to rigidly hold the shank in engagement with the spout portion 11ᵇ and thereby hold the guide 12ᵇ in its operative position. To release the means 45, the key 53 is turned to bring its head 55 to the vertical or longitudinal position where it is adapted to be passed by the opening 56 when the cutter 10ᵇ and guide 12ᵇ are pivoted or swung apart in the manner illustrated in Fig. 9 of the drawings.

The operation of the form of the invention illustrated in Figs. 9, 10 and 11 is similar to the operation of the foregoing embodiments of the invention. The means 45 rigidly holds the guide 12ᵇ in its proper operative position during the use of the device but permits the guide to swing away from or apart from the cutter if it becomes necessary or desirable to clean the opposing surfaces of the guide and cutter. The hinged connection between the guide and spout portion 11ᵇ and the means 45 do not materially complicate the construction or add to the cost of manufacture. The hinged connection between the guide 11ᵇ and the spout portion of the cutter prevents the cutter and guide from being separated.

The form of can opening and pouring device illustrated in Figs. 12 to 15, inclusive, of the drawings, includes generally, a cutter 10ᶜ operable to cut an opening in a can, a spout or spout portion 11ᶜ on the cutter, a guide 12ᶜ and a cover or closure 60 for closing the opening cut in the can to prevent the entrance of foreign matter, insects, etc., into the can.

The cutter 10ᶜ may be similar to or identical with the cutters of the foregoing embodiments of the invention. The cutter 10ᶜ is substantially U-shaped in transverse cross section, having spaced substantially parallel side parts 61 and a transversely curved outer part 62 connecting the side parts 61. The inner edges 64 of the cutter 10ᶜ are inclined downwardly and inwardly to converge to a point 63 on the lower end of the part 62. The edges 64 are preferably flat and substantially normal to the opposite surfaces of the side parts 61 to be effective in shearing or cutting the wall of the can when the cutter enters or is forced into the can. Openings 65 are provided in the walls of the cutter 10ᶜ to allow the contents of the can to readily drain out from around the cutter. The openings 65 are positioned to be immediately adjacent the end wall 66 of the container of can C through which the cutter is driven, to permit the entire contents to drain out through the cutter and spout.

The spout 11ᶜ is in the nature of a continuation or extension of the cutter 10ᶜ and projects from the end of the can C when the device is in position on the can. The spout or spout portion 11ᶜ is substantially U-shaped in transverse cross section having substantially parallel side parts 67 and a transversely curved outer part 68, connecting the parts 67. An outwardly or laterally projecting lip 69 is provided on the outer end of the spout portion 11ᶜ to facilitate the pouring of fluid from the spout and to provide a comparatively large surface to be acted upon or struck when the cutter is driven or forced through the end 66 of the can. In practice, the spout or spout portion 11ᶜ may be somewhat wider than the cutter 11ᶜ so that downwardly and inwardly inclined shoulders 70ᵃ are formed where the side parts 67 of the spout join the side parts 61 of the cutter.

The guide 12ᶜ is provided to engage the exterior of the can C to guide the cutter during the cutting or opening operation, and to aid in retaining the device in position on the can. The guide 12ᶜ includes a shank 70 attached to the spout portion 11ᶜ and a principal or can-engaging portion 71 extending downwardly alongside the outer part 62 of the cutter. The shank 70 is shaped to substantially conform to the outer side of the spout, and its upper end is preferably adjacent to or in engagement with the under side of the lip 69. The shank 70 may be attached to the part 68 of the spout in any suitable manner. In the particular construction illustrated in the drawings, the shank 70 is welded to the spout portion 11ᶜ at spaced points 72.

The can engaging portion 71 of the guide 12ᶜ is adapted to slidably engage the exterior of the can C when the cutter is driven or forced downwardly through the wall of the can and thereafter forcibly presses against the exterior of the can to hold the device on the can. The upper end of the can-engaging portion 71 of the guide is preferably spaced outwardly from the cutter part 62 so that a downwardly and outwardly inclined shoulder or bend 73 connects the portion 71 with the shank 70. The can-engaging portion 71 of the guide preferably inclines or slopes downwardly and inwardly toward the lower end of the cutter 10ᶜ so that the wall of the can is gripped between the guide and cutter when the device is in position on the can. In accordance with the preferred construction, the can-engaging portion 71 of the guide projects downwardly beyond the point 63 of the cutter to engage against the exterior of the can prior to the contacting of the point 63 with the upper wall 66 of the can when the can is to be opened to guide the point 63 into the can wall 66. The can-engaging portion 71 of the guide is preferably wider than the shank 70, as clearly illustrated in Fig. 13 of the drawings.

Longitudinally extending indentations or corrugations may be provided in the guide 12ᶜ to extend throughout the length of the shank 70 and form drain openings 75 in its inner side. The drain openings 75 extend from the shoulder 73 to the lip 69 to carry any liquid that may leak from around the cutter outwardly to the lip 69 as the contents are poured from the can. In practice, the indentations or corrugations providing the drains 75 may extend downwardly in the can-engaging portion 71 of the guide to form ridges 76 to reinforce and resist bending of the guide. The portions of the ridges 76 extending along the shank 71 may be crimped or provided with longitudinally spaced indentations 77. The parts or portions between the spaced indentations 77 constitute projections for engaging the edge or lip of the receptacle into which the contents are to be poured from the can C to prevent the device and can from tipping or slipping. If desired or found practical, the longitudinal edge portions of the guide may be bent inwardly or indented as at 77ᵃ to frictionally engage or bear against the exterior of the can C. These indented parts 77ᵃ, in engaging the can at circumferentially spaced points steady or stabilize the device, preventing it from tipping and otherwise aid it in holding the device in position on the can.

The cover or closure 60 is provided to close or seal off the opening cut in the end wall 66 of the can C by the cutter 10ᶜ and in accordance with the invention, is operatable between the closed position across the opening and an open position clear or free of the opening where it does not interfere with the pouring of the contents from the can. The cover closure 60 is carried by the spout portion 11ᶜ and is adapted to extend across or close the channel or opening at the upper end of the cutter where the cutter joins the spout portion. In the simple form of the invention being described, the cover or closure 60 is an integral member including an upper part 80 and a lower sealing or closure portion 81.

The upper portion 80 of the closure projects inwardly between the longitudinal inner edge portions of the spaced parts 67 of the spout and has outwardly projecting lugs or pins 82 on its opposite edges pivotable in openings 83 in the said parts of the spout. The upper portion 80 of the closure is shaped and proportioned so that it is adapted to be received between the spaced side parts 67 when the closure is in its in or closed position. A suitable handle 84 is provided on the closure 60. The handle 84 may be formed by making two spaced longitudinal cuts downwardly from the upper end of the portion 80 and bending the material between the cuts outwardly. The under side of the handle 84 is adapted to be engaged by the thumb of the user to swing the closure to the out or inoperative position, while the top or outer side of the handle is adapted to be engaged by the thumb of the user to swing or move the closure to its operative position.

The closure portion 81 is shaped and proportioned to effectively or closely fit against the inner walls of the combined cutter and spout to completely close off the opening formed in the wall 66 of the can C. The opposite side edges 86 of the closure portion 81 are substantially straight and parallel to cooperate with the inner surfaces of the spaced side parts 67 of the cutter and spout while the inner end of the closure portion is curved or rounded to fit against and seal with the inner surface of the cutter part 62. In accordance with the invention, the closure portion 81 is longitudinally curved so as to slidably engage the outer surface of the end 66 of the can C when the closure is moved to its closing position. The closure 60 is proportioned so that the lower side of its curved portion 81 tightly fits against or engages the end 66 of the can C at the inner end of the opening formed in the can by the cutter 10ᶜ. It will be apparent how the closure 60 is adapted to tightly and completely close off or seal the opening in the can wall 66 against the entrance of foreign material and insects. The closure 60 may be easily swung to an out position where it allows the contents to be freely poured from the spout portion 11ᶜ.

The operation of the form of the invention illustrated in Figs. 12, 13, 14 and 15 of the drawings is substantially the same as the operation of the previously described forms of the invention. The cutter 10ᶜ may be easily and quickly driven through the end 66 of the can to cut an opening therein by striking the upper surface of the lip 69 with the hand. The cutter 11ᶜ makes a clean unobstructed opening in the end of the can and its side portions 61 tightly fit and seal against the walls of the opening thus cut, to aid in holding the cutter in position. The guide 12ᶜ engages the exterior of the can to guide the cutter during operation and thereafter aids in locking or holding the cutter in place.

When it is desired to pour or drain the contents or some of the contents from the container C, the closure 60 is pivoted or operated to its open position by engaging under the handle 84 and pivoting the closure outwardly to permit the fluid to be poured out through the spout. When it becomes desirable to close or seal off the opening in the can, the closure 60 is swung or moved to its closed position where its portion 81 completely closes the liquid opening or channel in the device and tightly engages the outer surface of the end 66 of the can at the opening.

Figs. 16 and 17 of the drawings illustrate an embodiment of the invention characterized by a closure 60ᵈ and a detachable or removable guide 12ᵈ. The can opening and pouring device illustrated in Figs. 16 and 17 of the drawings includes, generally, a cutter 10ᵈ, a spout or spout portion 11ᵈ on the cutter, a guide 12ᵈ, and a closure 60ᵈ, the cutter 10ᵈ and the spout portion 11ᵈ being substantially identical in construction and operation to the corresponding parts of the device illustrated in Figs. 11 to 15 inclusive. The closure 60ᵈ may be identical in construction and operation to the closure 60 just described.

The guide 12ᵈ which is provided to guide the cutter 10ᵈ during the opening operation is similar, generally, to the guide 12ᶜ including a shank 70ᶜ and a can engaging portion 71ᶜ. The shank 70ᶜ is shaped and proportioned to closely or accurately conform to the outer side of the spout portion 11ᵈ and is provided with longitudinally extending ridges or corrugations 76ᶜ forming drain channels 75ᶜ. The opposite walls or side parts of the spout portion 11ᵈ are provided with a longitudinally extending inwardly facing shoulder 90. Inwardly projecting flanges 91 extend along the inner edges of the shank 70ᶜ to cooperate with the shoulders 90. When the guide 12ᵈ is in its operative position, the flanges engage outwardly against the shoulders 90 to effectively connect the guide 12ᵈ with the cutter and spout. To disconnect or release the guide from the spout and cutter, the guide is pulled or moved outwardly away from the cutter to spring the shank 70ᵃ and disengage the flanges 91 from the shoulders 90. When the guide 12ᵈ is thus disconnected from the cutter and spout, all the surfaces of the device are exposed and readily accessible for cleaning, etc. To again attach or connect the guide 12ᵈ to the spout portion 11ᵈ, the guide is positioned relative to the spout portion and cutter so that the flanges 90 bear against the rounded exterior of the spout portion. The shank 70ᶜ and the spout portion are then forced together to cause the shank portion to spring or flex, allowing the flanges 91 to snap in position in engagement with the shoulders 90.

Having described only typical forms and applications of my invention, I do not wish to be limited or restricted to the specific forms and applications herein set forth, but wish to reserve to myself any modifications or variations that may appear to those skilled in the art or fall within the scope of the following claims.

Having described my invention, I claim:

1. A device for opening containers including, a cutter adapted to cut an opening in a container, a guide of substantially arc shaped transverse cross section for cooperating with the container to guide the cutter, the arc defined by the guide being substantially less than 180° of a circle defined by the same radius of curvature, and means connecting the guide and cutter in a manner so that their adjacent parts may be moved apart to be accessible for cleaning.

2. A device for opening containers including, a cutter adapted to cut an opening in a container, the cutter having a portion to project from the container and form a pouring spout, a guide for cooperating with the container to guide the cutter, and means connecting the guide and spout portion of the cutter in a manner so that adjacent parts of the guide and the cutter and its spout portion may be separated to be accessible for cleaning.

3. A device for opening containers including, a cutter adapted to cut an opening in a container, a part on the cutter to project from the container, a projecting lip on said part presenting a surface to be acted upon to operate the cutter, and a guide detachably connected with the cutter and having an end engaging under said lip, the guide being operatable to engage the container to guide the cutter.

4. A device for opening containers including, a cutter adapted to cut an opening in a container, a part on the cutter to project from the container and form a pouring spout, a projecting lip on the spout part, a guide for engaging the container to guide the cutter, a pivotal connection between the guide and the lip, and means releasably connecting the guide with the spout part releasable to permit separating of the guide from the cutter.

5. A device for opening cans including, a cutter of substantially U-shaped cross section adapted to be forced through a wall of a can to cut an opening therein, the cutter having an extension to project from the can and form a pouring spout, a guide for engaging the can to guide the cutter, a shank on the guide shaped to seat against and conform generally to the extension, and means detachably connecting the shank to the extension.

6. A device for opening cans including, a cutter adapted to cut an opening in a wall of a container, the cutter having an extension to project from the can and form a pouring spout, a guide for engaging the container to guide the cutter, and means for detachably connecting the guide with the cutter including a shank on the guide having an opening and adapted to engage the extension of the cutter, and a projection on the extension cooperating with the said opening.

7. A device for opening cans including, a cutter adapted to cut an opening in a wall of a container, the cutter having an extension to project from the can and form a pouring spout, a guide for engaging the container to guide the cutter, and means for detachably connecting the guide with the cutter including a shank on the guide having an opening and adapted to engage the extension of the cutter, a projection on the extension to extend through said opening, and a head on the projection for cooperating with the shank.

8. A device for opening cans including, a cutter adapted to cut an opening in a wall of a container, the cutter having an extension to project from the can and form a pouring spout, a guide for engaging the container to guide the cutter, and means for detachably connecting the guide with the cutter including a shank on the guide adapted to engage the extension of the cutter, the shank having an opening, the opening having an enlargement, a projecting part on the extension adapted to project through said opening, and a head on the part for engaging the outer side of the shank, the part being turnable between a position where its head is out of register with said enlargement and a position where its head is in register with said enlargement to pass therethrough.

9. A device for opening cans including, a cutter adapted to cut an opening in a wall of a container, the cutter having an extension to project from the can and form a pouring spout, a guide for engaging the container to guide the cutter, and means for detachably connecting the guide with the cutter including a shank on the guide having an opening and adapted to engage the extension of the cutter, a projection on the extension adapted to extend through the opening, and a head on the projection for cooperating with the outer side of the shank, the said opening having an enlargement to pass the head upon shifting of the shank relative to the extension.

10. A device for opening cans including, a cutter adapted to cut an opening in a wall of a container, the cutter having an extension to project from the can and form a pouring spout, a guide for engaging the container to guide the cutter, a shank on the guide engaging the outer side of the extension, and means for connecting the shank and extension, there being a drain between the opposing faces of the extension and shank extending from a point adjacent the cutter to the outer end of the shank.

11. A device for opening cans including, a cutter adapted to cut an opening in a wall of a container, the cutter having an extension to project from the can and form a pouring spout, a guide for engaging the container to guide the cutter, a shank on the guide to engage the outer side of the extension, and means for connecting the shank and extension, there being a drain on the inner side of the shank extending outwardly from adjacent said wall of the container to the outer end of the shank.

12. A device for opening cans including a cutter adapted to cut an opening in a can, a channel shaped extension on the cutter to project from the can and form a pouring spout, a guide for engaging the can to guide the cutter, a shank part on the guide shaped to substantially conform to and bear against the outer surface of the extension, and means releasably connecting the extension and shank part in a manner so that their opposing surfaces may be moved apart.

13. A device for opening cans including a cutter adapted to cut an opening in a can, a channel shaped extension on the cutter to project from the can and form a pouring spout, a guide for engaging the can to guide the cutter, a shank part on the guide shaped to substantially conform to the outer surface of the extension, and shoulders on the extension and shank part held in cooperation through the resiliency of the shank part to releasably connect the extension and shank part.

14. A device for opening cans including a cutter adapted to cut an opening in a can, an extension on the cutter adapted to form a pouring spout, and a guide attached to the extension and adapted to engage the can to guide the cutter, there being a drain port for carrying liquid from between the cutter and guide to the outer end of the extension.

15. A device for opening cans including a cutter adapted to cut an opening in a can, an extension on the cutter adapted to form a pouring spout, and a guide attached to the extension and adapted to engage the can to guide the cutter, there being a drain between attached parts of the guide and extension for conducting liquid from between the cutter and guide to the outer end of the extension.

16. A device for opening containers including, a cutter adapted to cut an opening in a container, a guide of substantially arc shaped transverse cross section for cooperating with the container to guide the cutter, the arc defined by the guide being substantially less than 180° of a circle defined by the same radius of curvature, and means connecting the guide and cutter in a manner so that their adjacent parts may be moved apart to be accessible for cleaning and connecting the guide and cutter so that the arc shaped guide houses the cutter to a considerable degree.

OZRO N. WISWELL.